United States Patent
Mason et al.

Patent Number: 5,861,096
Date of Patent: Jan. 19, 1999

[54] ODOR CONTROL IN INDUSTRIAL LAGOONS

[75] Inventors: John Y. Mason, Plymouth, Calif.; Darrell L. Dechant, Westminster, Colo.

[73] Assignee: Sabre Oxidation Technologies, Inc., Odessa, Tex.

[21] Appl. No.: 853,656

[22] Filed: May 9, 1997

[51] Int. Cl.⁶ .................. C02F 1/76; C02F 3/28; B01D 53/52; B01D 53/34

[52] U.S. Cl. ............ 210/631; 210/754; 210/756; 210/916; 210/747; 423/224; 423/243.01; 423/243.08; 422/4; 422/5

[58] Field of Search ................ 210/754, 756, 210/916, 631, 747; 423/243.01, 243.08, 220, 224; 422/4, 5

[56] References Cited

U.S. PATENT DOCUMENTS

| | | |
|---|---|---|
| 1,799,444 | 4/1931 | Sperr . |
| 2,796,399 | 6/1957 | Sanders et al. ............ 210/916 |
| 3,113,924 | 12/1963 | Mendius, Jr. ............. 210/916 |
| 3,300,404 | 1/1967 | Howe et al. ............. 210/916 |
| 3,594,980 | 7/1971 | Diehl ..................... 55/237 |
| 4,125,589 | 11/1978 | De Vries . |
| 4,141,702 | 2/1979 | De Vries . |
| 4,155,975 | 5/1979 | Riley . |
| 4,202,882 | 5/1980 | Schwartz . |
| 4,225,566 | 9/1980 | De Vries . |
| 4,238,461 | 12/1980 | De Vries . |
| 4,302,226 | 11/1981 | Rafson . |
| 4,307,067 | 12/1981 | Tagawa . |
| 4,308,040 | 12/1981 | Rafson . |
| 4,416,861 | 11/1983 | De Vries ................ 423/210 |
| 4,816,220 | 3/1989 | Chowdhury . |
| 5,137,687 | 8/1992 | Durson, Jr. ............. 422/5 |

*Primary Examiner*—Thomas M. Lithgow
*Attorney, Agent, or Firm*—R. L. Graham

[57] ABSTRACT

Wastewater lagoons are treated with chlorine oxygen compounds to react with odorous sulfides and mercaptans emanating from the lagoon. A fine spray of an aqueous solution of the chlorine oxygen compound (HOCl, $NaClO_2$, or NaOCL) is applied over the lagoon. The chlorine oxygen compounds react with the sulfides in the vapor zone above the lagoon, converting the odorous compounds to non-odorous compounds.

12 Claims, 1 Drawing Sheet

ODOR CONTROL IN INDUSTRIAL LAGOONS

BACKGROUND OF THE INVENTION

This invention relates generally to odor abatement in wastewater in anaerobic digestive lagoons. In one specific aspect, the invention relates to a method of treating wastewater lagoons using a fine spray of an aqueous solution of a chemical to react with the odor vapors emanating from the lagoon surface, converting the odors (e.g. $H_2S$ and mercaptans) to non odor compounds.

Many industrial plants utilize lagoons (e.g. ponds) to stabilize and equalize wastewaters. By collecting and storing wastewaters in lagoons the biochemical oxygen demand (BOD) of the water is reduced. BOD is a means of estimating the degree of biodegradable contamination of wastewater. It is the amount (mg/liter) of oxygen required during stabilization of the decomposable organic matter by biochemical action. Storage of wastewater for relative long periods of time, typically 1 to 30 days, reduces the BOD and thus improves the quality of the effluent water. The stabilization can be accelerated by aeration in aerobic digestive systems.

The size of wastewater lagoons vary considerably, but generally cover from 1,000 square feet to several million square feet.

The most common source of odors in wastewater is reduced sulfur compounds such as $H_2S$ and mercaptans which result from the anaerobic (bacteria) decomposition of biodegradable organic matter in the presence of sulfates. In aerobic digestive systems, odor generally is not a problem. The present invention is, accordingly, directed specifically to the treatment of anaerobic digestive systems.

The present methods of chemically treating wastewater for odor reduction include (a) aqueous treatment with an oxidant such as potassium permanganate; (b) chlorination of wastewater liquids with a chlorine compound such as elemental chlorine, sodium of calcium hypochlorite, or chlorine dioxide; and (c) ozoning. All of these systems are economically impractical for large lagoons.

SUMMARY OF THE INVENTION

The method of the present invention involves the step of spraying an aqueous solution of a chlorine compound over substantial areas of the wastewater lagoon to react with the malodor (e.g. sulfides) vapors emanating from the surface of the lagoon.

The preferred treating solutions include chlorine oxygen compounds. Chlorine oxygen compounds include those containing Cl and O in the cation in water (e.g. $ClO_2^-$ and $OCl^-$). These compounds include chlorine (HClO in water), chlorite salts and hypochlorites. The preferred treating compounds are sodium chlorite and sodium hypochlorite, with the former being the most preferred. These compounds are known to react with odorous sulfides to form non-odorous compounds such as $S^O$ and sulfates.

The concentration of the active compound in the water will depend on several factors including the severity of the odor problem and economics. As a general rule concentrations in the range of 1 to 500 ppm preferably 5 to 100 ppm in the treating water will be sufficient for most applications.

The spray may be provided by spray nozzles, airless nozzles, foggers and the like. The spray system may include a pipe distribution system to dispense the spray over the problem area of the lagoon, which could be influenced by the prevailing winds. Preferably, the distribution system will deliver the spray to a zone substantially covering the lagoon. Preferably, the spray droplets will be very fine (10–100 microns) to ensure intimate mixing with the odor vapors.

The rate of the spray over the lagoon will range from 5 to 100 liters of water per square meter of the lagoon treated over a 24 hour period. The spray may be continuous or intermittent.

Although the spray feed water may be obtained from any source, for economical reasons it is preferred that the spray feed water be obtained from the lagoon wastewater itself.

BRIEF DESCRIPTION OF THE DRAWING

The drawing is a schematic of a spray system for treating a wastewater lagoon in accordance with the present invention.

DESCRIPTION OF THE PREFERRED EMBODIMENTS

Figure 1:
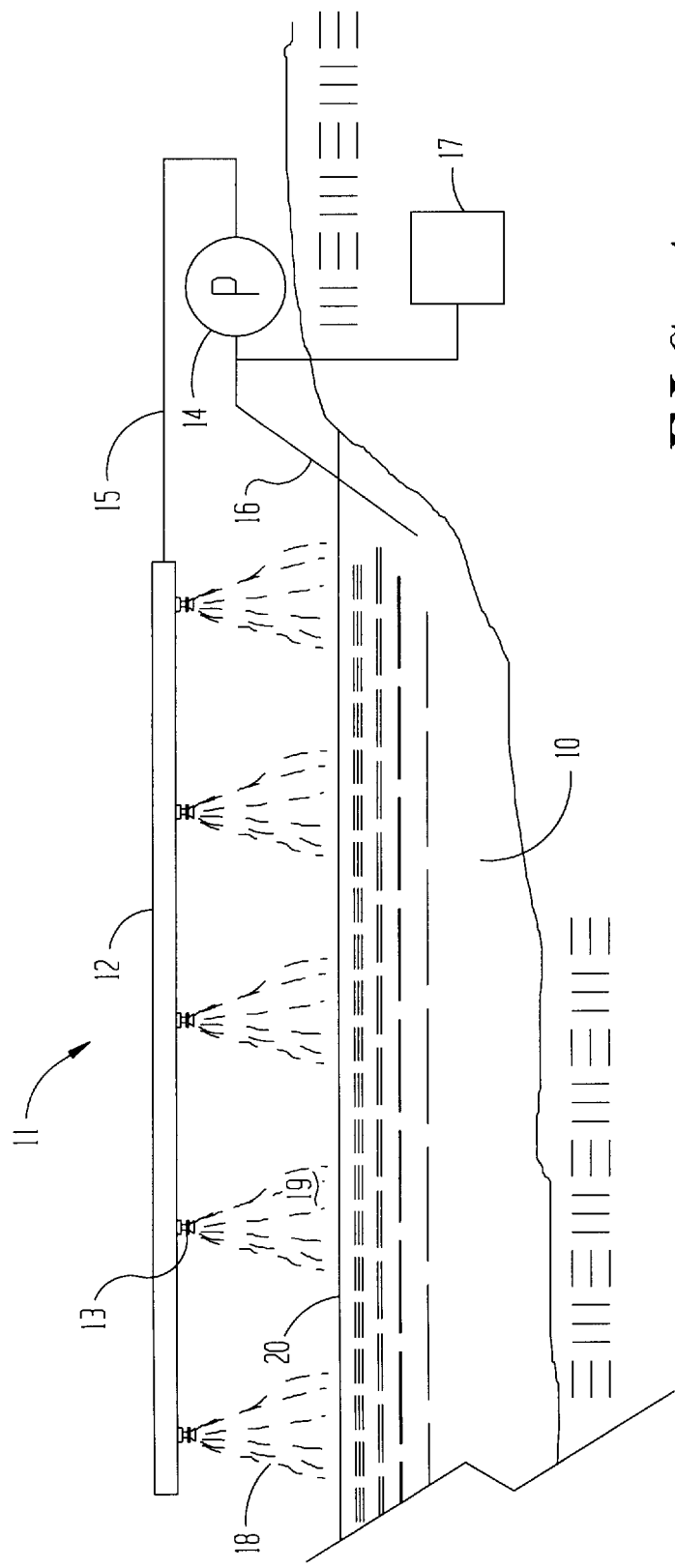

As schematically illustrated in the Drawing, a wastewater lagoon 10 has disposed thereover a sprinkling or spray system 11. The spray system 11 may comprise distribution piping 12 provided with spaced apart spray nozzles 13.

Although the drawing discloses a 2 dimensional system 11, in practice the spray system will be in the form of a grid covering a large area of the lagoon 10. The distribution piping 12 may be fed with treated water by pump 14 through pipe 15. The pump, in turn, may take its suction water from the lagoon through suction pipe 16 or may be connected to a separate water source such as a municipal water system. Chemical may be metered into line 15 by a conventional chemical pump or eductor 17.

The distribution piping 12 may be suspended on a support structure (not shown) to enable adjustment of distance between the nozzles 13 and the surface of the lagoon. The following system design parameters are provided as representative of a typical system useable for carrying out the method of the present invention.

| Piping (12): | Size | ¼ to 8 inches, preferably ¾ to 2 inch |
|---|---|---|
| | Materials | PVC, HDPE |
| Nozzles (13): | Type | Misting or fogging nozzles |
| | Size | ¼ to 1 inch |
| | Output* | 1 to 10 gph |
| | Spacing | 25 to 100 feet |
| | Spray area | 50 to 1,000 ft$^2$ |
| | Elevation | 1 to 10 feet (above water surface) |
| Pump or Eductor (17): | 0.1 to 100 gallons per minute | |

*perimeter nozzles 2 to 5 gpm

As indicated above, the preferred chemicals used in the spray water include sodium chlorite (although other chlorite salts may be used) and hypochlorites, preferably sodium hypochlorite. Sodium chlorite, sometimes referred to in the industry as stabilized chlorine dioxide, is commercially available as a dry solid or as an aqueous solution. Suppliers of sodium chlorite include Vulcan Chemical and Sterling Chemicals. For convenience of handling it is preferred to use an aqueous solution of sodium chlorite at concentrations of 5 to 25 wt. % which can be diluted at the place of use.

Chlorine dissolved in water may also be used. In this embodiment, the active compound is hypochlorous acid.

In operation a wastewater lagoon to be treated will be analyzed to identify the malodors and the BOD levels. If the malodors include sulfides and other reduced sulfur compounds—which most anaerobic systems do—then the lagoon is a candidate for treatment by the present invention. A distribution system will be designed and installed to cover most of the lagoon. The system may include valving to permit treatment of only portions of the system or to cycle treatments within the system.

For long term treatments, the system may be mounted or suspended on a permanent substructure which may include concrete piling and support beams. Winches strategically located may serve as means for adjusting the level of the grid distribution system relative to the water surface. Upon completion of the spray facilities, the pumping of the wastewater through the system may begin to permit adjustment of the spray nozzles as to spray rates and spray scope. Ideally, the spray from each nozzle flare out radially and overlap with the spray of adjacent nozzles to ensure complete coverage of the sprayed area.

The chemical is injected by a chemical pump or eductor 17 to provide the desired chlorine-oxygen compound concentration in the treating water. The water droplets in the spray 18 containing the chlorine-oxygen ions contact the sulfides in the vapor zone 19 above the lagoon surface 20 and react as follows (depending on the treating compound):

A) Chlorite $$ClO_2^- + H_2S \rightarrow Cl^- + 2S^O + 2H_2O$$

$$2ClO_2^- + H_2S \rightarrow H_2SO_4 + 2Cl^-$$

B) Hypochlorite $$OCl^- + H_2S \rightarrow S^O + Cl^- + H_2O$$

$$4OCl^- + H_2S \rightarrow SO_4^= + 2H^+ + 4Cl^-$$

C) $Cl_2$ gas in water to form hypochlorous acid ($Cl_2 + H_2O \rightarrow HCl + HOCl$)

$$HOCl + H_2S \rightarrow S^O + Cl^- + H_2O$$

$$4HOCl + H_2S \rightarrow SO_4^= + 4Cl^- + 5H^+$$

The fine spray, mist, or fog, causes the aqueous solution to intimately mix with the odor vapors in the vapor zone 19. This causes substantially all of the odorous sulfides to react with the $ClO_2$ or $OCl$ ions in the vapor zone 19. The droplet sizes of the spray may range from 10 to 1,000 microns, but preferably ranges from 10 to 500 microns and most preferably 10 to 100 microns.

A particular advantage of sodium chlorite over other treating compounds, aside from its low cost, is that it is stable with other organic and inorganic compounds in wastewater to permit the wastewater from the lagoon to be used as the spray water. In large volume treatments, it may be impractical to use fresh water.

Tests have shown that relatively low dosages (100 ppm or less) of the sodium chlorite in the spray water achieved 20 to 50 fold reductions in the sulfide compounds.

The following example describes specific preferred embodiments:

EXPERIMENTS

Example 1

A side stream from the discharge of a pulp mill is passed through a tank at such a rate as to allow for 5 days of retention time. The head space of the tank was allowed to equilibrate for five days. After this period the concentration of $H_2S$ in the headspace of the tank was 700 ppb, and the odor of the headspace gas was very offensive. A solution containing 100 mg/l of sodium chlorite was sprayed in the headspace inside the tank at a rate of 1 gallon per hour per 225 square feet of surface. After five minutes of treatment, the odor substantially disappeared.

Example 2

A test cell was constructed of Plexiglas that measured two feet wide by two feet high by four feet long. Two atomizing nozzles were installed in the lid of the device to apply chemical to the atmosphere of the chamber. The bottom of the chamber was filled with three inches of sludge from an egg processing plant. The material was allowed to stagnate for 24 hours and the head space of the chamber was tested for odor and hydrogen sulfide. The hydrogen sulfide lever was measured as 2.1 ppm by an Arizona instruments Jerome model 631X. Approximately 0.4 gallons of a solution containing 250 mg/l of sodium chlorite was applied to the test container over a 2 hour period through the atomizer misters. The hydrogen sulfide concentration was then again measured and determined to be less than 20 ppb in the test container. Odor was evaluated in the container and found to be acceptable.

Example 3–10

These tests were performed under the same methodology as Example 2 with the exception that the test substances were varied in each test. The results from these tests are shown below.

| Example | Waste | Headspace Ppm $H_2S$ Before | Headspace ppm $H_2S$ After | Comments |
|---|---|---|---|---|
| 3 | Egg wash effluent | 4.2 | (0.005 | |
| 4 | Pig waste | 3 | (0.005 | |
| 5 | Packing Plant waste water | 2.4 some "fat" | (0.005 | Still retained type odor |
| 6 | Pulp mill effluent | 0.7 | (0.005 | |
| 7 | Tomato paste plant effluent | 0.35 odor | (0.005 | Slight tomato |
| 8 | Fish packing waste water | 3.70 also removed | (0.005 | Fish odor |
| 9 | Soy process water | 2.2 | (0.005 | |
| 10 | Clarifier sludge | 0.35 | (0.005 | |
| 11 | Ballast water | 0.68 | (0.005 | Slight oil odor still present |

Example 12

A field test was employed by passing a waste water stream through a commercially available portable 20,000 gallon tank. The approximate dimensions of the tank were 8 feet wide by 10 feet tall by 40 feet long. The tank had a closed top. The waste stream was water from a petrochemical plant. About 500 gallons of anaerobic sludge containing reduced sulfur compounds was added to the tank. When the depth of the fluid reached about three feet in the tank it was allowed to remain stagnant for 3 days. The resulting headspace concentration of $H_2S$ was 4.2 ppm. Ten 5 gallon per hour misting nozzles were plumbed into the roof of the tank in such a manner as to provide good misting coverage of the surface area. The misters were operated for 4 hours with a solution containing 50 mg/l of sodium chlorite. Following the treatment, the concentration of $H_2S$ in the headspace was less than 0.005 ppm as measured by Arizona instruments Jerome model 631X.

The above tests demonstrate the effectiveness of the treatment according to the present invention in reducing odors in a variety of wastewaters.

What is claimed is:

1. A method of reducing odors of large wastewater lagoons contaminated with odorous sulfide or mercaptan compounds resulting from anaerobic decomposition of biodegradable organic matter which comprises spraying over at least 1,000 $ft^2$ of the surface of a lagoon an aqueous solution of a chlorine oxygen compound, the spray being sufficiently fine and at a sufficient elevation above the surface to permit the chlorine oxygen compound to contact and react with sulfide or mercaptan vapors emanating from the surface thereby converting them to non-odor compounds.

2. The method of claim 1 wherein the chlorine oxygen compounds are selected from the group consisting of hypochlorous acid, chlorites, and hypochlorites.

3. The method of claim 2 wherein the chlorine oxygen compounds react with the odorous compounds in a zone from 1 to 10 feet above the water surface of the lagoon.

4. The method of claim 2 wherein the sprayed solution is an aqueous solution of from 1 to 500 ppm sodium chlorite.

5. The method of claim 4 wherein the concentration of the spray over the sprayed area is 5 to 100 liters per $m^2$ of surface area per day.

6. The method of claim 1 wherein the spray is in the form of a mist or fog.

7. The method of claim 6 wherein the spray droplets have an average particle size of 10 to 500 microns.

8. The method of claim 1 wherein the spray is from nozzles positioned from 1 to 10 feet above the surface of the lagoon.

9. A method of reducing odors of a large wastewater lagoon having odorous sulfide and mercaptan vapors emanating from the surface thereof and resulting from anaerobic digestion of biodegradable organic matter, said method comprising the steps of:

(a) positioning a spray system over at least 1,000 $ft^2$ of the lagoon, said spray system having spray nozzles uniformly distributed in the system and positioned from 1 to 10 feet above the surface of the lagoon;

(b) pumping wastewater from the lagoon to the spray system;

(c) introducing from 1 to 500 ppm of a chlorite compound into the wastewater pumped to the spray system, said compound being reactive with the odorous sulfide to form a non-odorous compound; and (d) discharging the wastewater containing the chlorite compound from the nozzles to form a uniform spray over at least 1,000 $ft^2$ of the lagoon, so that odorous vapors emanating from the lagoon contact the spray and react with the chlorite salt in a zone above the surface of the water.

10. The method of claim 9 wherein the spray rate is from 5 to 100 liters/$m^2$ of sprayed area per day.

11. The method of claim 10 wherein the chlorite compound is selected from sodium chlorite and sodium hypochlorite.

12. The method of claim 11 wherein the chlorite salt is sodium chlorite.

* * * * *